United States Patent
Schier et al.

[19]

[11] Patent Number: 5,833,250
[45] Date of Patent: Nov. 10, 1998

[54] GARDEN CART

[75] Inventors: Walter Schier; Joe Schier, both of Hudson, N.H.

[73] Assignee: SchierJoy, Ltd., Hudson, N.H.

[21] Appl. No.: 616,842

[22] Filed: Mar. 15, 1996

[51] Int. Cl.[6] ............................................. B62B 1/14
[52] U.S. Cl. ........................... 280/47.19; 280/47.26; 280/47.33
[58] Field of Search ..................... 280/655.1, 47.17, 280/47.19, 47.24, 47.26, 47.31, 47.315, 47.33, 47.35, 47.371, 79.2

[56] References Cited

U.S. PATENT DOCUMENTS

| | | | |
|---|---|---|---|
| D. 142,513 | 10/1945 | Cross | 280/47.19 |
| D. 243,752 | 3/1977 | Kardas | D12/32 |
| D. 332,682 | 1/1993 | Staab | D34/21 |
| 1,660,521 | 2/1928 | Nordgren | 280/47.35 |
| 2,905,480 | 9/1959 | Giovannelli | 280/47.19 |
| 2,981,549 | 4/1961 | Hotton | 280/47.371 |
| 3,116,936 | 1/1964 | Magarian | 280/47.19 |
| 3,759,538 | 9/1973 | Fabiano | 280/47.35 |
| 3,894,748 | 7/1975 | Ratcliff | 280/641 |
| 4,049,284 | 9/1977 | Capper | 280/47.18 |
| 4,350,366 | 9/1982 | Helms | 280/655 |
| 4,947,998 | 8/1990 | Smeller | 280/47.26 |
| 5,106,112 | 4/1992 | Sargent | 280/47.19 |
| 5,318,315 | 6/1994 | White | 280/47.26 |
| 5,390,944 | 2/1995 | Sherwin | 280/47.35 |

FOREIGN PATENT DOCUMENTS

| | | | |
|---|---|---|---|
| 729739 | 12/1966 | Italy | 280/47.24 |
| 825781 | 12/1959 | United Kingdom | 280/47.26 |
| 2133977 | 8/1984 | United Kingdom | 280/47.26 |

*Primary Examiner*—Brian L. Johnson
*Assistant Examiner*—Frank Vanaman
*Attorney, Agent, or Firm*—John P. Costello

[57] ABSTRACT

A human-powered, wheeled, garden cart, capable of carrying an entire ensemble of garden and yard tools. This garden cart includes a top platform, a bottom platform, and a hollow center member coupled between the top and bottom platforms. The top platform includes slots placed along its sides for placing long-handled tools in an upright manner, through-holes for placing straight, long-handled tools in an inverted manner, and additional penetrations for hanging smaller tools. The bottom platform includes cutouts matching the through-holes in the top platform for seating the inverted, straight-handled, tools. Two oblong wells are also provided in the bottom platform for stabilizing the heads of axes, pickaxes and splitting mauls. The center member is compartmentalized for storing medium sized tools such as bow saws. A retractable towing handle extends from the front of the center member and provides a mechanical advantage for easily towing a heavily loaded cart. A pair of pocketed rear legs lend support to the cart and provide storage for small tools like trowels, weeders, and pruning shears.

4 Claims, 4 Drawing Sheets

GARDEN CART

BACKGROUND OF THE INVENTION

1. Field of the Invention

This invention pertains to a garden cart and, more specifically, to a garden cart which allows for the storage and transport of an entire ensemble of garden and yard tools.

2. Description of the Background Art

A typical gardener has a large ensemble of garden and yard tools of all sizes and shapes such as shovels, rakes, hoes, cultivators, axes, pickaxes, bow saws, pruning saws, limb cloppers, hedge clippers, brooms, trowels, weeders, pruning shears, hose nozzles, sprinkler heads, etc. In a normal gardening operation, a gardener may desire to use many of these tools to accomplish a multitude of tasks. Often the gardener either carries many tools out to the work site, or else endures many trips to the tool shed, or garage, to retrieve tools as they are needed. Ideally, a gardener would have a garden cart which could store an entire ensemble of tools, regardless of the size or shape of the tools. Upon needing a particular tool, the gardener could "grab" the tool from the cart and use it.

Various garden carts have been devised for storing and transporting a plurality of garden tools thereon. For example, U.S. Pat. No. 5,318,315 issued to White et al., on Jun. 7, 1994, discloses a garden cart which can operate as a wheelbarrow when tilted in a horizontal position, and as a gardening shelf for storing potted plants, and the like, when tilted into a vertical position. This garden cart includes a plurality of vertical tubes, located therein, for vertically positioning a plurality of garden tools.

U.S. Pat. No. 4,350,366 issued to Helms on Sep. 21, 1982, discloses a garden cart which includes a series of vertical tubes for placing a plurality of garden tools. This device, while being square and bulky, nevertheless includes a storage bin, and a wide handle, which can be retracted for easy storage.

U.S. Pat. No. 3,894,748, issued to Ratcliff on Jul. 15, 1975, discloses a lawn and garden cart for transporting and storing garden implements, having a platform possessing a multitude of holed slots for placing a plurality of garden tools in a vertical position. A large, squarish, lower platform allows a gardener to place heavy objects, such as potted plants, thereon. This device includes four caster wheels which allow this garden cart to be transported.

Des. U.S. Pat. No. 332,682 issued to Staab on Jan. 19, 1993, discloses a design for a lawn and garden cart, having a squarish construction and a plurality of through-holes for placing garden tools in a vertical position.

Many of the foregoing patents disclose garden carts having a bulky, square, or rectangular, body. The square configuration of these garden carts renders them difficult to store in confined spaces. Also, the bulky configuration of the carts disclosed in the previous patents do not lend to easy transport through standard 30" door frames.

Additionally, the foregoing patents disclose garden carts which are pushed, rather than pulled, and as a result distribute the bulk of their weight in front of, rather than behind, the user. This distribution of weight results in awkward steering, since the heavily loaded front end often seeks its own path, especially upon traveling over uneven, or unpaved, surfaces, requiring the user to expend substantial physical effort to redirect the cart onto its desired path. Hence it is desirable for a garden cart to be configured for easy steering and transport, regardless of whether the cart is heavily, or lightly, loaded.

Also, the foregoing patents disclose garden carts designed for storing long-handled tools such as shovels and rakes, only, and do not present an efficient storage method for tools such as bow saws or hand clippers. Consequently, it would be desirable for a gardener to have access to an entire ensemble of tools so that multiple trips back to the garage or tool shed to retrieve tools, are avoided.

Therefore, there is a need for a human powered garden cart capable of storing and transporting an entire ensemble of garden tools. Additionally, it is desirable for a cart loaded with such an ensemble of tools to be able to move easily through a standard 30" door frame and that it further have a shape conducive for easy storage in a cramped garage or tool shed. Finally, a garden cart must be configured for being easily steered by the user. The present garden cart invention meets these requirements, resulting in a garden cart of exceptional utility.

The foregoing patents reflect the state of the art of which the inventor is aware and are tendered with a view toward discharging the inventor's acknowledged duty of candor in disclosing information which may be pertinent to the examination of this invention. It is respectfully stipulated, however, that none of these patents teach or render obvious, singly or when considered in combination, the inventor's claimed invention.

SUMMARY OF THE INVENTION

The present invention pertains to a generally triangular, human-powered garden cart, capable of containing an entire ensemble of garden and yard tools thereupon. This garden cart occupies less than one square yard of floor area and its triangular shape allows it to be easily stored in cramped garages, tool sheds, and the like. The garden cart disclosed herein is designed to be pulled or towed by the user, by utilizing, an extendable, lever-like, towing handle. The ability of this cart to be towed rather than pushed, allows a heavily loaded cart to be easily moved and maneuvered.

By way of example and not of limitation, the garden cart disclosed herein has top and bottom triangular platforms joined by a hollow "keel-like" center member. The center member has a compartmentalized interior, for storing medium-sized tools, such as bow saws and limb cloppers. Each compartment in the center member is wide enough to store two compatible tools, side by side. A towing handle doubles as a lever for easily lifting and towing a heavily loaded cart. The towing handle retracts into the hollow interior of the center member, thereby allowing the garden cart to be easily stored in a confined space.

The top platform has slots placed along its three sides which allows for long, straight-handled, or long, D-handled tools, to be positioned therein. These slots would accommodate garden tools, such as rakes, pick axes or shovels, which could be positioned along the sides of the garden cart, for easy access. The slots are of a sufficient depth to contain two long-handled tools. The top platform also includes a plurality of round and oblong through-holes for placing garden and yard tools. The majority of the round through-holes match with a plurality of cutouts located in the bottom platform, for placing the inverted handles of long-handled tools, therein. The additional round and oblong through-holes in the top platform which have no counterparts in the bottom platform, are for hanging smaller tools like pruning saws, hedge clippers, weeders, trowels, etc.

The slightly larger bottom platform allows the bottoms of tools positioned in the top platform slots to rest upon the bottom platform. A dowel, a trough, or other retaining means, on the bottom platform, prevents these tools from slipping or bouncing off the sides of the bottom platform. The long-handled tools in the upper platform slots, therefore have their sharp and pointed edges positioned on the lower platform downward, or inward, for safety. The elongate handles of tools placed in the slots in the top platform are restrained therein by rubber straps, or similar means.

The round cutouts in the bottom platform are backed by a slat coupled to the underside of the bottom platform. The slat is separated from the bottom platform by small spacers located on either side of each cutout. In this arrangement, the spacers allow water to drain from the cutouts. The bottom platform also includes oblong wells which penetrate the bottom platform. These oblong wells are backed on the underside of the bottom platform, by a flat plate, but unlike the round cutouts, no spacer separates this plate from the bottom platform. Drainage is provided at the ends of the oblong well by leaving a space between the edge of the plate and the edge of the well. The oblong wells function to stabilize the head of axes, splitting mauls, and pick axes, placed in the slots located along the base of the top platform. If the cart is to be manufactured from plastic, these wells would be molded into the bottom platform.

The ability of this garden cart to be towed, rather than pushed, allows it to be easily maneuvered across uneven and unpaved surfaces, like those found in a typical yard. The triangular design of this cart allows the front of the cart to be pointed in any desired direction, while the rear of the cart easily follows, similar to a car trailer.

A pair of rear support legs, positioned at the base corners of the triangular platforms, render added rigidity and support to this garden cart. The rear legs have been designed to be "pocketed," for purposes of placing small tools such as pruning shears, trowels, and hose nozzles therein. Preferably, the bottoms of the pockets in the support legs are angled downward, toward the bottom platform, at 45 degrees, for purposes of retaining tools therein. The pocketed rear legs substantially increase the small tool carrying capacity of the garden cart.

The bottoms of the rear legs extend below the bottom platform to provide an attachment point for a pair of wheels. The wheels support the rear of the cart, while a front member extends downward from the center member to provide support for the front of the cart. The front member serves to keep the garden cart stationary and stable, even on sloped surfaces. A pair of wheel wells, or fenders, can be designed into the bottom platform to allow the wheels to rotate free from the interference of tools positioned adjacent to the wheels on the bottom platform. The design of the garden cart as disclosed herein provides a well-balanced, utilitarian garden cart, capable of storing upwards of 40 garden tools thereon.

An object of the invention is to provide a garden cart which can organize and store an entire ensemble of garden and yard tools, both large and small, thereupon.

Another object of the invention is to provide a compact, efficiently-shaped, garden cart, capable of fitting easily within a cramped garage or tool shed.

Another object of the invention is to provide a garden cart which can be easily transported when heavily loaded with garden and yard tools.

A further object of the invention is to provide a garden cart capable of moving easily through standard 30" door frames while fully loaded with garden and yard tools.

Another object of the invention is to provide a garden cart which remains stationary on sloped surfaces when not being towed.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
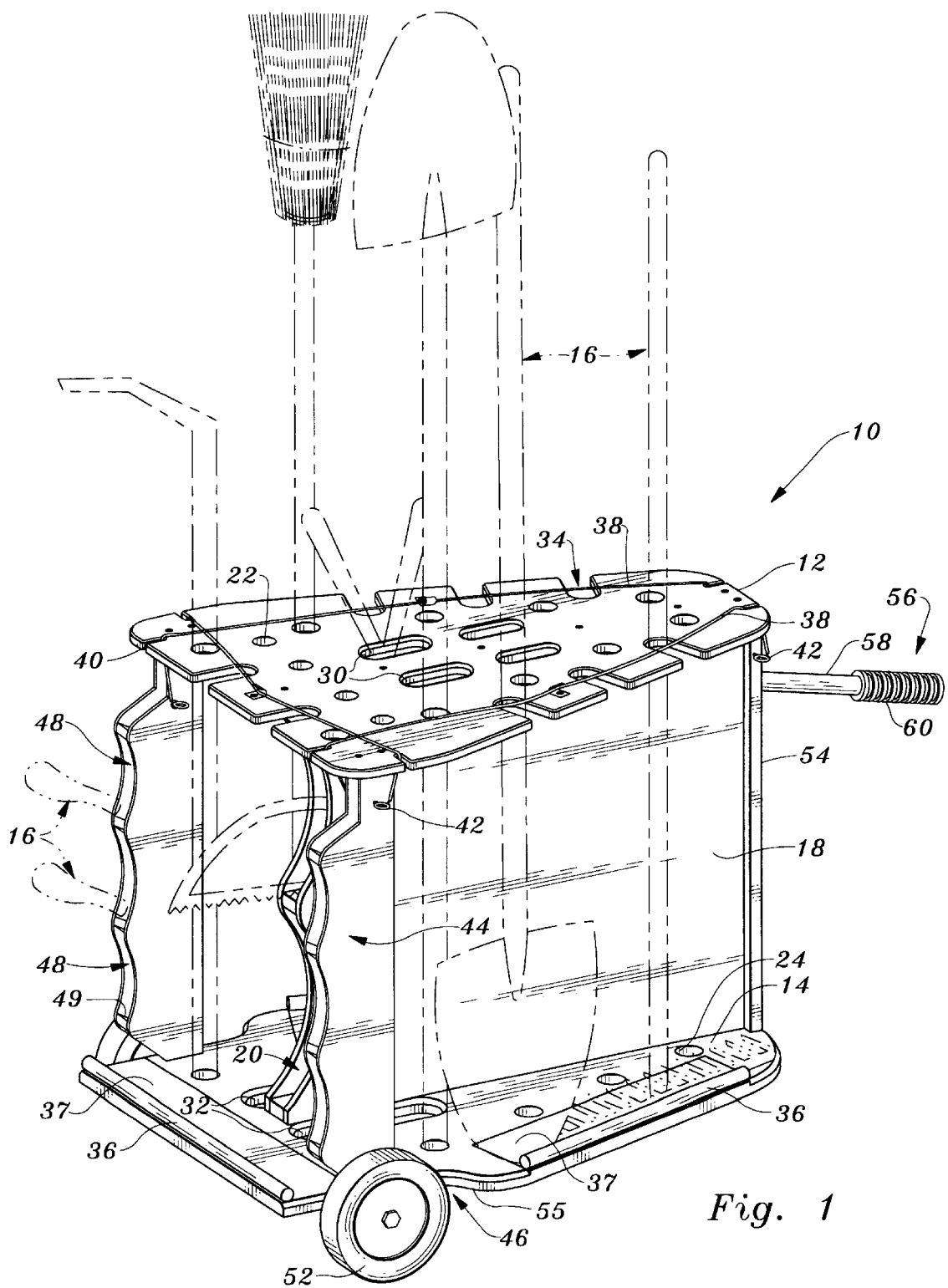
FIG. 1 is a perspective view of the garden cart which is the present invention, shown loaded with an ensemble of garden tools.

Referring more specifically to the drawings, the present invention is embodied in the garden cart 10 generally shown in FIG. 1. Garden cart 10 may be constructed from a variety of materials including wood, metal, or plastic. Additionally, the components comprising garden cart 10 may be manufactured through machining or molding processes. It will be further appreciated that garden cart 10 may vary as to the configuration and details of its parts without departing from the basic concepts as disclosed herein.

Figure 2:
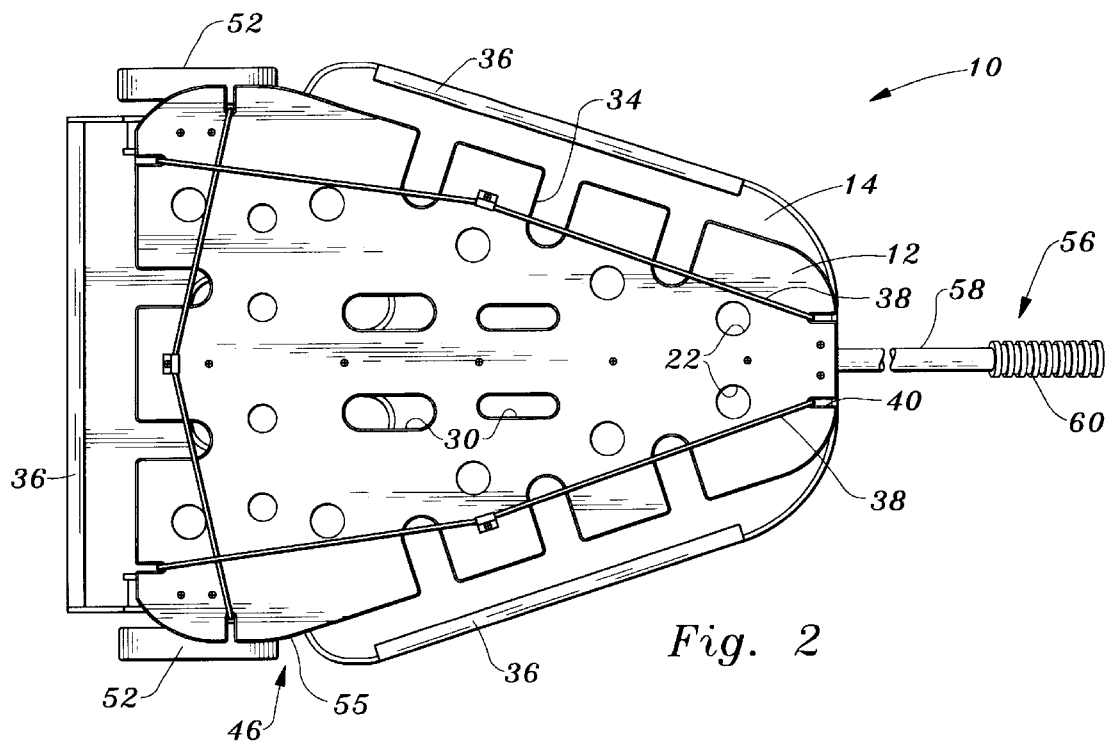
FIG. 2 is a plan view of the garden cart which is the present invention.
Figure 3:
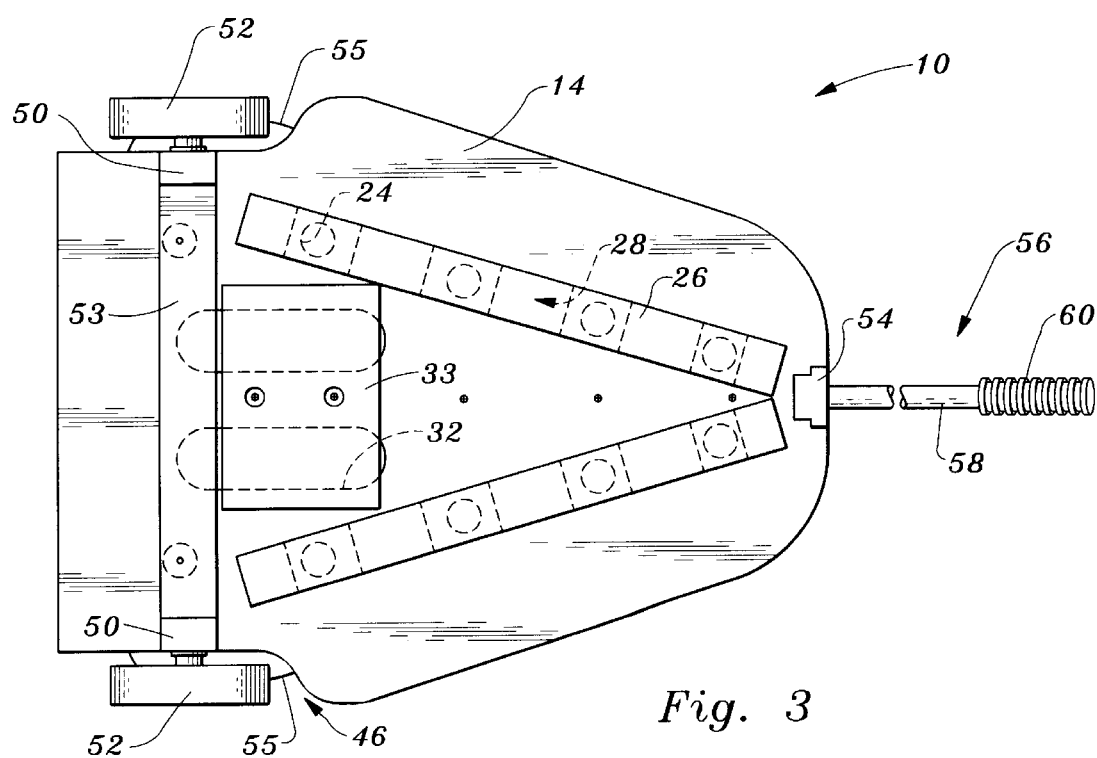
FIG. 3 is a bottom view of the garden cart depicted in FIG. 2.

Referring additionally to FIGS. 2–3, it is seen that garden cart 10 includes the elements of top platform 12 and bottom platform 14 located in a parallel relation to each other. The generally triangular shape of platforms 12, 14 give cart 10 a narrow front and a wide base, or rear, portion, which has been found to be preferable for fitting within a cramped garage or tool shed. However, other shapes having a wide base and narrow front, such as diamond shapes, or various polygonal shapes, would suffice for top and bottom platforms 12, 14.

Bottom platform 14 is slightly larger than top platform 12, this larger configuration of bottom platform 14 providing additional surface area for the bottoms of garden and yard tools 16 to rest upon. A "keel-like" center member 18 is positioned vertically and perpendicularly between top and bottom platforms 12, 14 and thereby provides structural rigidity to garden cart 10.

Figure 4:
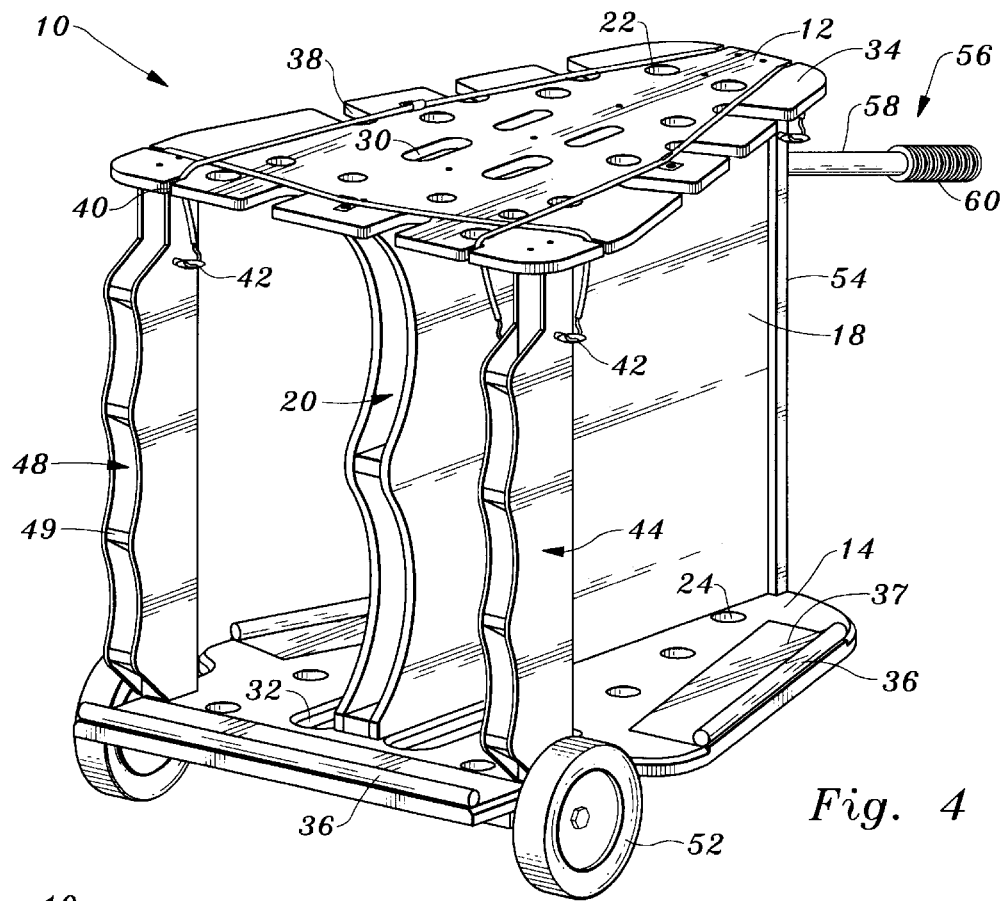
FIG. 4 is a rear perspective view of the garden cart which is the present invention.

FIG. 4 illustrates the hollow and compartmentalized construction of center member 18. Center member 18 may have two or more compartments 20 for storing medium sized garden and yard tools 16 such as limb cloppers and bow saws, therein. Compartments 20 are accessible at the rear of center member 18 and are preferably of a width sufficient for allowing at least two medium sized garden tools 16 to be placed side by side.

The parallel positioning of top and bottom platforms 12, 14 allows for the alignment of round through-holes 22 in top platform 14 with round cutouts 24 in bottom platform 14. This identical positioning of round through-holes 22 with round cutouts 24 allows for long-handled garden and yard tools 16, such as shovels, hoes and brooms, to be placed in an inverted position. Round through-holes 22 and round cutouts 24 completely penetrate top and bottom platforms 12, 14, however round cutouts 24 are backed on the underside of bottom platform 14 by slats 26 and spacers 28. Slats 26 provide a stop against which the handle-ends of inverted tools rest. Spacers 28 provide a gap between slats 26 and bottom platform 14 for allowing water to drain from bottom platform 14 and cutouts 24.

In usage, a user would invert a broom, for example, placing the handle end in round through-hole 22, and subsequently, allow the handle end to descend, and seat, in round cutout 24. The user would then load garden cart 10 in a similar fashion, until each round through-hole 22 and round cutout 24 was occupied with a garden tool 16.

Top platform 12 also includes oblong through-holes 30 and bottom platform 14 likewise includes oblong cutouts 32. Oblong through-holes 30 and oblong cutouts 32 provide a means for placing garden tools 16 which cannot be accommodated by round through-holes 22 and round cutouts 24. Oblong through-holes 30 have no matching counterpart on bottom platform 14, and allow for hanging small and medium-sized tools, such as trowels, pruning saws, and hedge trimmers.

Oblong cutouts 32 are backed by plate 33 which serves as a bottom for oblong cutout 32, thereby creating a well for stabilizing the heads of axes, pick axes, or splitting mauls. Plate 33 is preferably sized to allow for space along the sides of oblong cutouts 32 to remain, for drainage purposes.

Figure 5:
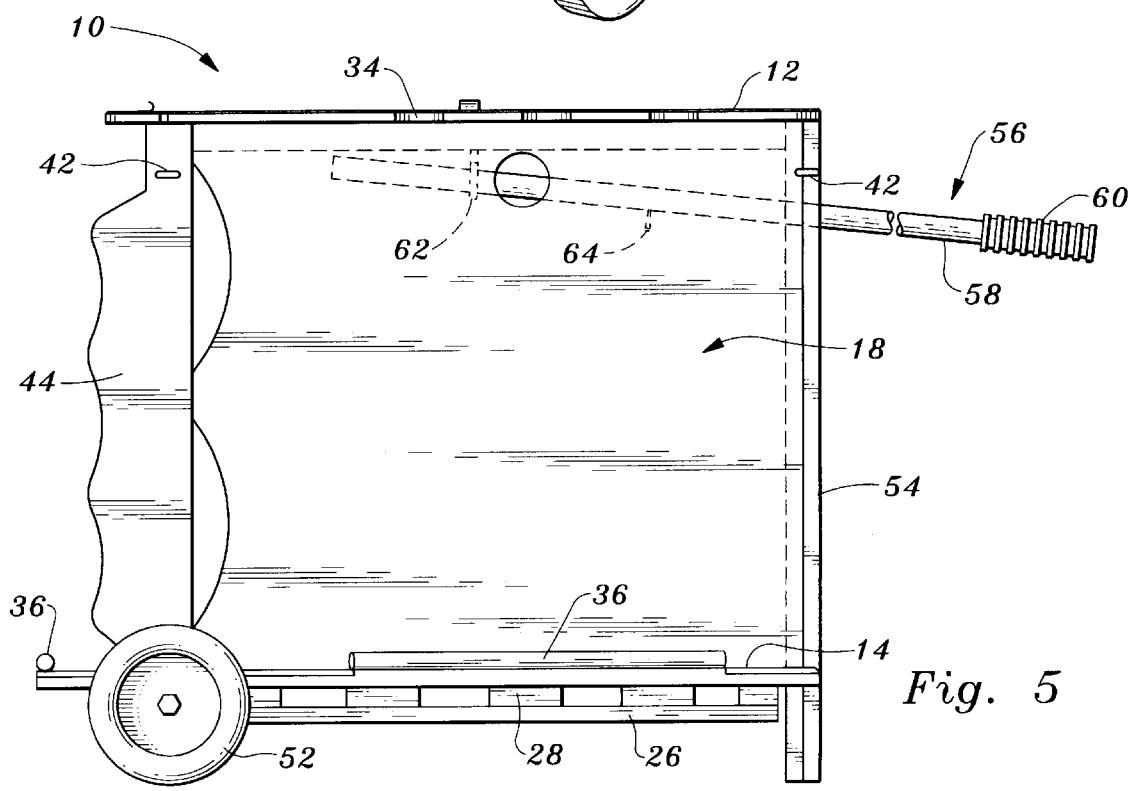
FIG. 5 is a side view of the garden cart which is the present invention shown with the towing handle in phantom.

Referring additionally to FIG. 5, it can be seen that top platform 12 has slots 34 placed along its three sides. Slots 34 allow long-handled garden tools 16, such as rakes, cultivators, pick axes and shovels, to be positioned along the sides of the cart, for easy access. Thereby, slots 34 allow a user to place his most utilized long-handled tools 16 along the sides of garden cart 10. Slots 34 readily accommodate D-gripped and shaped-handled tools. Tools 16 in slots 34 have their sharp and pronged heads pointed downward, and inward, on bottom platform 14. Slots 34 are preferably of a sufficient depth to contain two long-handled tools. The slightly larger bottom platform 14 allows the bottoms of garden tools 16 to rest upon the sides of bottom platform 14 upon being positioned in slots 34. A plurality of dowels 36 or other retaining means, such as three troughs, on bottom platform 14, prevent garden tools 16 from slipping, or bouncing, off the sides of the bottom platform. Additionally, a non-skid floor strip 37, or like material, can be added to insure against tools 16 slipping or marring the surface of bottom platform 14.

A restraining strap 38, or similar means, serves to hold garden tools 16 in place within slots 34 on top platform 12. Restraining straps 38 are seated in retaining slots 40. Restraining straps 38 are anchored at their centers with their hooked ends attaching to eye bolts 42.

A pair of rear support legs 44, positioned symmetrically upon the rear portions 46 of platforms 12, 14, render added rigidity and support to garden cart 10. Rear legs 44 preferably include pockets 48, for placing small tools, such as pruning shears and hose nozzles, therein. Pockets 48 preferably have bottoms 49, angled at 45 degrees, to insure that any tools 16 placed therein will remain. The pocketed rear legs 44 substantially increase the small tool carrying capacity of garden cart 10.

The bottoms 50 of rear support legs 44 extend below bottom platform 14 to provide an attachment point for wheels 52, which are positioned adjacent to the rear or base portion 46 of bottom platform 14. Bottoms 50 of support legs 44 are braced by support beam 53. Wheels 52 support the rear of garden cart 10, while a front member 54 extends downward from the front of center member 18 to provide support for the front of cart 10. A pair of wheel wells 55, or fenders, can be designed into bottom platform 14 to allow wheels 52 to rotate free from the interference of tools positioned upon bottom platform 14. Front member 54 is coupled to the front of center member 18 and serves to keep garden cart 10 stationary and stable, even on sloped surfaces, when not being towed.

Figure 6:
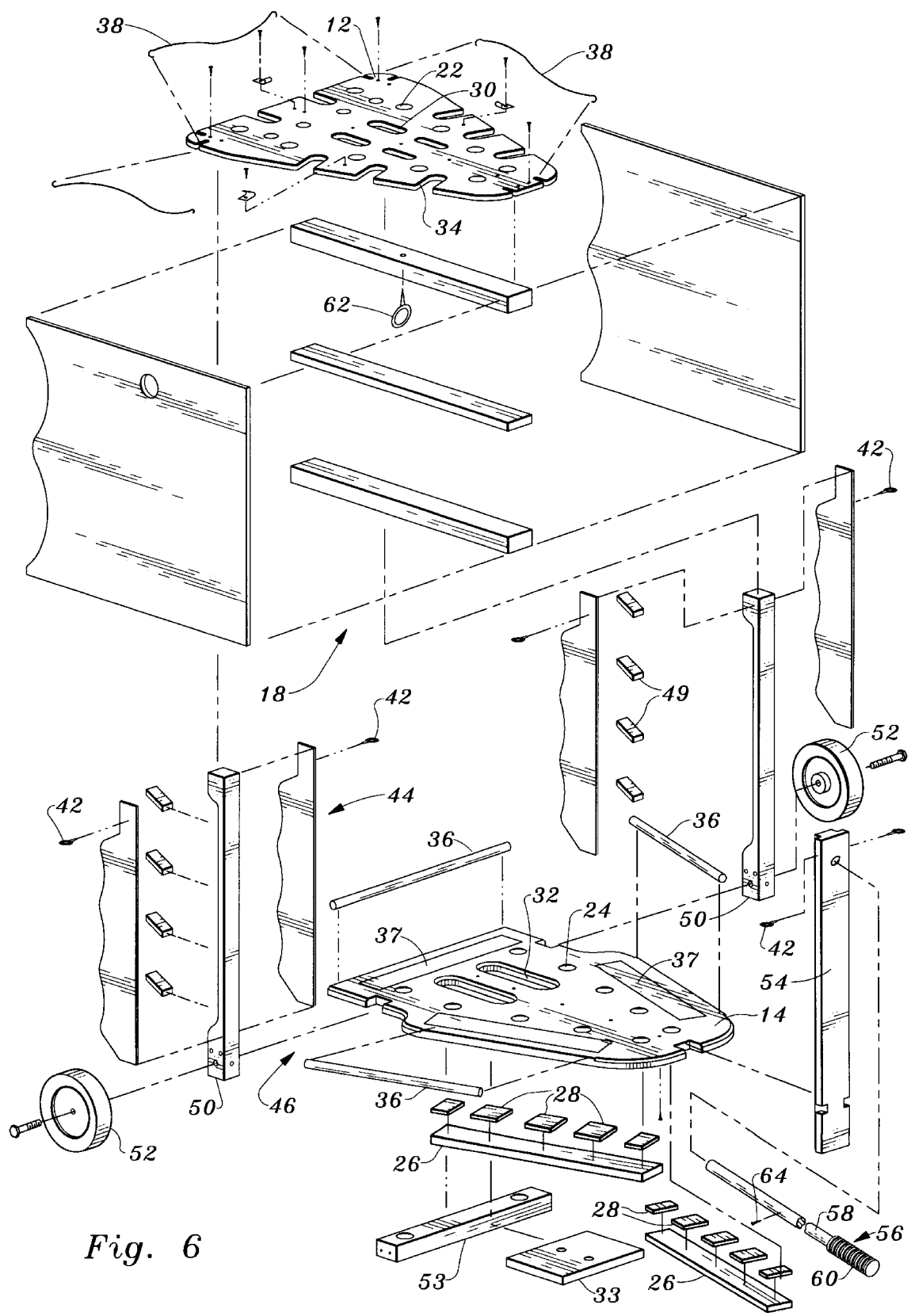
FIG. 6 is an exploded view of the garden cart which is the present invention, showing the relation of its various parts.

Referring additionally to FIG. 6, towing handle 56 can be more closely examined. Towing handle 56 includes handle shaft 58 and hand grip 60. Towing handle 56 is partially retractable into center member 18 to allow for the space efficient storage of the garden cart 10. The mechanism for retracting towing handle 56 is preferably an eye bolt 62 located near the midpoint of center member 18 and a stop-screw 64 with a thick rubber washer coupled to handle shaft 58. In use, handle shaft 58 slides through eye bolt 62. Upon full extension of towing handle 56, stop-screw 64 bottoms against front member 54. Upon full retraction of towing handle 56, stop-screw 64 bottoms against eye bolt 62. It is preferable that upon being extended, towing handle 56 be of a length which permits a user to comfortably tow garden cart 10, without any portion of the cart striking the user's heels.

Towing handle 56 provides a lever-like mechanical advantage for easily moving a fully loaded garden cart 10. The mechanical advantage provided by towing handle 56 allows garden cart 10 to be easily lifted at front member 54 and moved with wheels 52 carrying approximately 80% of the load.

The ability of garden cart 10 to be towed, rather than pushed, allows it to be easily maneuvered across uneven and unpaved surfaces, like those found in a typical yard. The preferred triangular design of garden cart 10 is similar to the triangular frames of many types of car-towed trailers. The triangular design of this garden cart 10 allows the front of the cart to be pointed in any desired direction, while the rear of the cart easily follows, similar to a car trailer.

The preferred triangular shape of garden cart 10 coupled with the retractable towing handle 56, results in a very space-efficient cart which can be easily accommodated in a crowded garage or tool shed. At its widest base portion, garden cart 10 is no wider than 27", which is a width sufficient for moving through standard-size 30" door frames. It has been found that this garden cart 10 is capable of carrying over 40 garden tools, while occupying a floor area of less than one square yard.

Accordingly, it will be seen that this invention provides a human-powered garden cart capable of storing and carrying an entire ensemble of garden and yard tools thereon. The compact nature and triangular shape of this cart allows it to be stored easily within the confined spaces of a cramped garage or tool shed. The design features of this garden cart allows it to accommodate small hand tools up to long-handled garden and yard tools, such as rakes, shovels and brooms.

Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A garden utility cart, the cart comprising:

a top platform and a bottom platform, said top and bottom platforms located in a parallel relation to each other, said top and bottom platforms having a narrow front portion and a wide rear portion, said top and bottom platforms each having at least three sides;

a center member, said center member being coupled between said top and bottom platforms, said center member having a front and a rear, said center member further having a compartmentalized interior;

a pair of support legs, said support legs being coupled symmetrically between said rear portions of said top and bottom platforms, said support legs having a plurality of angled pockets for retaining small tools therein;

said top platform having a plurality of slots placed along its sides, said top platform further having a plurality of through-holes, said through-holes being both round and oblong in shape;

said bottom platform having a plurality of round cutouts, said round cutouts positioned identically to said round through-holes in said top platform;

wheel means for transporting said cart, said wheel means being coupled adjacent to said rear portion of said bottom platform; and a towing handle for towing said cart, said towing handle extending outward from said front of said center member.

2. A cart for carrying a plurality of garden and yard tools, the cart comprising:

a generally triangular top platform and a generally triangular bottom platform, said top and bottom platforms located in a parallel relation to each other, said top platform further comprising a plurality of slots placed along its sides;

said top and bottom platforms being coupled to a center member, said center member having a compartmentalized interior;

support legs, said support legs extending between, and being coupled to, said top and bottom platforms, said support legs having a plurality of angled pockets for retaining small tools therein;

said top platform having a plurality of through-holes, said through-holes being both round and oblong in shape;

said bottom platform having a plurality of round cutouts, said round cutouts positioned identically to said round through-holes in said top platform;

wheel means for transporting said cart, said wheel means coupled adjacent to said bottom platform; and a towing handle, said towing handle removable from said center member.

3. A cart for storing and carrying a plurality of garden and yard tools, the cart comprising:

a triangular top platform and a triangular bottom platform, said top and bottom platforms located in a parallel relation to each other, said top and bottom platforms having a narrow front portion and a wide base portion;

said top and bottom platforms being coupled to a center member, said center member being positioned medially and perpendicularly between said top and bottom platforms;

said center member having a compartmentalized interior;

support legs, said support legs being coupled symmetrically to said base portions of said top and bottom platforms, said support legs having a plurality of angled pockets;

said top platform being penetrated by a plurality of round and oblong through-holes;

said top platform having a plurality of slots, said slots distributed along three sides of said top platform;

a plurality of restraining straps for restraining said plurality of tools within said slots;

said bottom platform having a plurality of round cutouts positioned identically to said round through-holes in said top platform;

tool retaining means for retaining said tools on said bottom platform;

wheel means for transporting said cart, said wheel means being coupled adjacent to said base portion of said bottom platform; and a towing handle, said towing handle retractable within said center member.

4. The cart as recited in claim 3, wherein said tool retaining means are three dowels coupled to each of three sides of said bottom platform.

* * * * *